(12) United States Patent
Niemi et al.

(10) Patent No.: US 7,246,242 B1
(45) Date of Patent: Jul. 17, 2007

(54) INTEGRITY PROTECTION METHOD FOR RADIO NETWORK SIGNALING

(75) Inventors: Valtteri Niemi, Helsinki (FI); Jaakko Rajaniemi, Helsinki (FI); Ahti Muhonen, Hirvihaara (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/009,658

(22) PCT Filed: May 11, 2000

(86) PCT No.: PCT/FI00/00421

§ 371 (c)(1),
(2), (4) Date: Mar. 27, 2002

(87) PCT Pub. No.: WO00/69206

PCT Pub. Date: Nov. 16, 2000

(30) Foreign Application Priority Data

May 11, 1999 (FI) .................................. 991088

(51) Int. Cl.
*H04L 9/00* (2006.01)
(52) U.S. Cl. ..................... 713/181; 380/255
(58) Field of Classification Search ............... 370/12, 370/445; 380/247; 726/18, 19; 713/181
See application file for complete search history.

(56) References Cited

U.S. PATENT DOCUMENTS

| | | | | |
|---|---|---|---|---|
| 5,239,294 A | | 8/1993 | Flanders et al. | 340/825.34 |
| 5,369,705 A | * | 11/1994 | Bird et al. | 713/163 |
| 5,369,707 A | | 11/1994 | Follendore, III | 380/25 |
| 5,475,763 A | | 12/1995 | Kaufman et al. | 380/49 |
| 5,592,553 A | | 1/1997 | Guski et al. | 380/23 |
| 5,703,952 A | * | 12/1997 | Taylor | 380/44 |
| 5,757,913 A | | 5/1998 | Bellare et al. | 380/23 |
| 5,757,919 A | | 5/1998 | Herbert et al. | 380/25 |
| 6,078,568 A | * | 6/2000 | Wright et al. | 370/312 |
| 6,591,364 B1 | * | 7/2003 | Patel | 713/170 |
| 6,918,035 B1 | * | 7/2005 | Patel | 713/169 |

FOREIGN PATENT DOCUMENTS

| | | |
|---|---|---|
| EP | 0 789 673 A1 | 10/1997 |
| JP | 05-219053 | 8/1993 |
| JP | 10-032571 | 2/1998 |

(Continued)

OTHER PUBLICATIONS

Official Action (dated Mar. 29, 2006) for Japanese Appln. 2000-617681.

*Primary Examiner*—Matthew Smithers
(74) *Attorney, Agent, or Firm*—Squire, Sanders & Dempsey L.L.P.

(57) ABSTRACT

The invention is directed to a method for checking the integrity of messages between a mobile station and the cellular network. Two time-varying parameters are used in MAC calculation, one of which is generated by the mobile station, and the other by the network. The parameter specified by the network is used in one session only, and is transmitted to the mobile station in the beginning of the connection. The parameter specified by the mobile station is stored in the mobile station between connections in order to allow the mobile station to use a different parameter in the next connection. The parameter specified by the mobile station is transmitted to the network in the beginning of the connection.

8 Claims, 2 Drawing Sheets

FOREIGN PATENT DOCUMENTS

| | | |
|---|---|---|
| JP | 10-136082 | 5/1998 |
| JP | 10-304432 | 11/1999 |
| WO | WO 94/21066 | 9/1994 |
| WO | WO 97/16904 | 5/1997 |
| WO | WO 99/14888 | 3/1999 |

* cited by examiner

INTEGRITY PROTECTION METHOD FOR RADIO NETWORK SIGNALING

PRIORITY CLAIM

This is a national stage of PCT application No. PCT/FI00/00421, filed on May 11, 2000. Priority is claimed on that application, and on patent application No. 991088 filed in Finland on May 11, 1999.

TECHNICAL FIELD OF THE INVENTION

The invention is directed to a method for checking the integrity of messages between a mobile station and the cellular network. Particularly, the invention is directed to such a method as described in the preamble of Claim 1.

BACKGROUND OF THE INVENTION

All telecommunication is subject to the problem of how to make sure that the received information is sent by an authorized sender and not by somebody who is trying to masquerade as the sender. The problem is evident in cellular telecommunication systems, where the air interface presents an excellent platform for eavesdropping and replacing the contents of a transmission by using higher transmission levels, even from a distance. A basic solution to this problem is authentication of the communicating parties. An authentication process aims to discover and check the identity of both of the communicating parties, so that each party receives information about the identity of the other party, and can trust the identity to a sufficient degree. Authentication is typically performed in a specific procedure at the beginning of the connection. However, this leaves room for unauthorized manipulation, insertion, and deletion of subsequent messages. Thus, there is a need for separate authentication of each transmitted message. The latter task can be done by appending a message authentication code (MAC) to the message at the transmitting end, and checking the MAC value at the receiving end.

A MAC is typically a relatively short string of bits, which depends in some specified way on the message it protects and on a secret key known both by the sender and by the recipient of the message. The secret key is generated and agreed typically in connection with the authentication procedure in the beginning of the connection. In some cases the algorithm that is used to calculate the MAC based on the secret key and the message is also secret but this is not usually the case.

The process of authentication of single messages is often called integrity protection. To protect the integrity of signaling, the transmitting party computes a MAC value based on the message to be sent and the secret key using the specified algorithm, and sends the message with the MAC value. The receiving party recomputes a MAC value based on the message and the secret key according to the specified algorithm, and compares the received MAC and the calculated MAC. If the two MAC values match, the recipient can trust that the message is intact and sent by the supposed party. One may note in passing, that integrity protection does not usually include protection of confidentiality of the transmitted messages.

Integrity protection schemes are not completely perfect. A third party can try to manipulate and succeed in manipulating a message transmitted between a first and a second party. There are two main alternative methods for forging a MAC value for a modified or a new messages, namely by obtaining the secret key first, and by trying directly without the secret key.

The secret key can be obtained by a third party basically in two ways:
  by computing all possible keys until a key is found, which matches with data of observed message-MAC pairs, or by otherwise breaking the algorithm for producing MAC values; or
  by directly capturing a stored or transmitted secret key.

The original communicating parties can prevent a third party from obtaining the secret key by using an algorithm that is cryptographically strong and which uses a long enough secret key to prevent exhaustive search of all keys, and using other security means for transmission and storage of secret keys.

A third party can try to disrupt messaging between the two parties without a secret key basically by guessing the correct MAC value, or by replaying of some earlier message transmitted between the two parties, for which message the correct MAC is known from the original transmission.

Correct guessing of the MAC value can be prevented by using long MAC values. The MAC value should be long enough to reduce the probability of guessing right to a sufficiently low level compared to the benefit gained by one successful forgery. For example, using a 32 bit MAC value reduces the probability of a correct guess to 1/4 294 967 296, which is small enough for most applications.

Obtaining a correct MAC value using the replay attack i.e. by replaying an earlier message can be prevented by introducing a varying parameter to the calculation of the MAC values. For example, a time stamp value, a sequence number, or a random number can be used as a further input to the MAC algorithm in addition to the secret integrity key and the message. The present invention is associated with this basic method. In the following, the prior art methods are described in more detail.

When using a time stamp value, each communicating party needs to have an access to a reliable clock in order to be able to calculate the MAC in the same way. The problem with this approach is the need of the reliable clock. The clocks of both parties must be very accurate and be very accurately in time. However, this condition is unacceptable in cellular telecommunication systems: both parties, i.e. the mobile station (MS) and the network do not have access to a clock, that is reliable enough.

When using sequence numbers, each party has to keep track of those sequence numbers that have already been used and are not acceptable any more. The easiest way to implement this is to store the highest sequence number used in MAC calculations so far. This approach has the drawback, that between connections each party must maintain state information which is at least to some level synchronized. That is, they need to store the highest sequence number used so far. This requires the use of a large database at the network side.

A further approach is to include a random number in each message, which the other side must use in MAC calculation when for the next time sending a message, for which MAC authentication is required. This approach has the same drawback as the previous one, i.e. between connections each party must maintain state information, which requires the use of a large database at the network side.

U.S. Pat. No. 5,475,763 by Kaufman et al. (1995) describes a signature system, such as an El Gamal or DSS system, involving the use of long term secret number and a per-message secret number generates the per message secret number without the use of a random number generator or non-volatile storage. The per-message secret number is generated by applying a one-way hash function to a combination of the long term secret number and the message itself.

SUMMARY OF THE INVENTION

An object of the invention is to realize a method for integrity checking, which avoids the problems associated with prior art. A further object of the invention is to provide a method for integrity checking, which does not require storage of state information on the network side.

The objects are reached by using two time-varying parameters in MAC calculation, one of which is generated by the mobile station, and the other by the network. The parameter specified by the network is used in one session only, and is transmitted to the mobile station in the beginning of the connection. The parameter specified by the mobile station is stored in the mobile station between connections in order to allow the mobile station to use a different parameter in the next connection. The parameter specified by the mobile station is transmitted to the network in the beginning of the connection.

The method according to the invention is characterized by that, which is specified in the characterizing part of the independent method claim. The dependent claims describe further advantageous embodiments of the invention.

According to the invention, both parties specify a varying parameter to be used in the generation of MAC values. On the network side in a mobile network, all state information about the particular user can be discarded after the connection is released. According to the invention, both a sequence number and a network specified value such as a pseudorandom number is used in calculation of the MAC value. In the beginning of the connection, the mobile station determines the initial value used for the sequence counting, and transmits the value to the network. In addition to the initial value, a counter value is used. The initial value and the counter value are concatenated, added or combined in some other way to produce the parameter to be used in the calculation of the MAC value of a message. One way of combining the two values is using the initial value as the starting value of the counter, which corresponds to the addition of the counter value and the initial value. The invention does not limit which counter values are used in the inventive method. A suitable value is for example the protocol data unit (PDU) number of the radio link control (RLC) protocol, i.e. the RLC PDU number. Another suitable value is the use of a counter, which is incremented at fixed intervals, for example every 10 milliseconds. Preferably, a counter such as the RLC PDU counter which is already present in mobile stations and in the network is used in a method according to the invention. Further, also counters associated with ciphering of data over the radio interface can be used in a method according to the invention. Further, the invention does not limit which initial value is used in the inventive method. For example, the current hyperframe number at the time of initiating of the connection can be used as the initial value. Further, the counter values do not need to be transmitted after the transmission of the initial value, since both sides of the connection can update the counters in the same way during the connection, preserving synchronization. Preferably, when a connection is released, the mobile station stores into its memory the initial value used in the connection or at least the most significant bits of the initial value, which allows the mobile station to use a different initial value next time. The mobile station can save the information for example in the SIM (Subscriber Identity Module) card or another memory device, for allowing the mobile station to use a value previously stored in the SIM card of the mobile station in specifying the initial value.

The network specifies the random number, or in practice a pseudorandom number in the beginning of the connection. The random number is session specific, i.e. it does not need to be changed within a connection or transmitted to the mobile station more than once in the beginning of the connection, and neither does it need to be stored in the network between connections. Advantageously, the network element generating the random number and taking care of MAC value generation and checking of received messages and MAC values is the radio network controller (RNC). However, the invention is not limited to that, since these functions can be realized in many other network elements as well. The use of RNC is advantageous, since in that case the core network of the cellular telecommunication system does not need to participate in integrity checking of single messages, and since radio access network messaging may also need to be protected by integrity checking.

The invention allows both sides of the connection to perform integrity checking. Since the network specifies a random value in the beginning of the connection, a mobile station of a hostile party cannot successfully perform a replay attack by replaying a message recorded from a previous connection. Since the mobile station specifies the initial value for the connection, replay attacks from a bogus network element operated by a hostile party will not succeed.

BRIEF DESCRIPTION OF THE DRAWINGS

The invention is described in more detail in the following with reference to the accompanying drawings, of which

Same reference numerals are used for similar entities in the figures.

DETAILED DESCRIPTION

Figure 1:
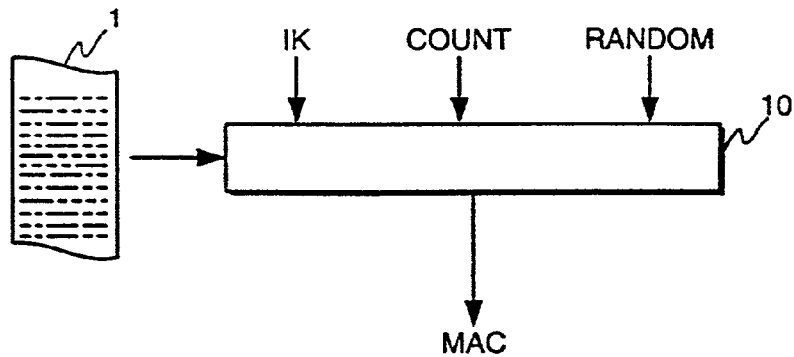
FIG. 1 illustrates an advantageous embodiment of the invention.

FIG. 1 illustrates a way of calculating the MAC value according to the invention. The IK is the secret integrity key, which is generated during a mobile station authentication procedure in the beginning of a connection. Because the same IK key is used to authenticate many messages possibly even during many consecutive connections, time-varying parameters are needed to avoid hostile attacks during the connection. For that purpose, a counter value COUNT and a random value RANDOM are used in the MAC calculation as well. According to the invention, a message 1 and the IK, COUNT, and RANDOM values are input into a calculation means 10, which calculates a MAC value according to the inputs and the particular authentication algorithm. We note here, that the invention is not limited to any specific way of calculating the MAC value from the inputs illustrated in FIG. 1. The invention is not limited to any specific lengths of the input values. For example, for the UMTS (Universal Mobile Telecommunication System) cellular system suitable lengths are 128 bits for the IK value, 32 bits for the COUNT value, 32 bits for the RANDOM value, and 16 bits for the MAC value. However, other lengths could be used even for the UMTS system, and other inputs can be used in addition to these values.

If a new IK value is generated in an authentication process in the beginning of the current connection, the mobile station can reset the initial value of COUNT, since new IK value provides security against replay attacks. The storing of the initial value or a part of it for use with the next connection is necessary, since the IK value might not change, when the next connection is established. This is very probable for example when using a multifunction mobile station in the UMTS system, since the mobile station can have multiple simultaneous connections of various types, and establish and release new connections during a single communication session. The network does not necessarily perform full authentication for each new connection, whereby the mobile station will not always receive a new IK value for each new connection. However, when the IK is changed, the mobile station can reset the initial COUNT values without danger of compromising security.

Figure 2:
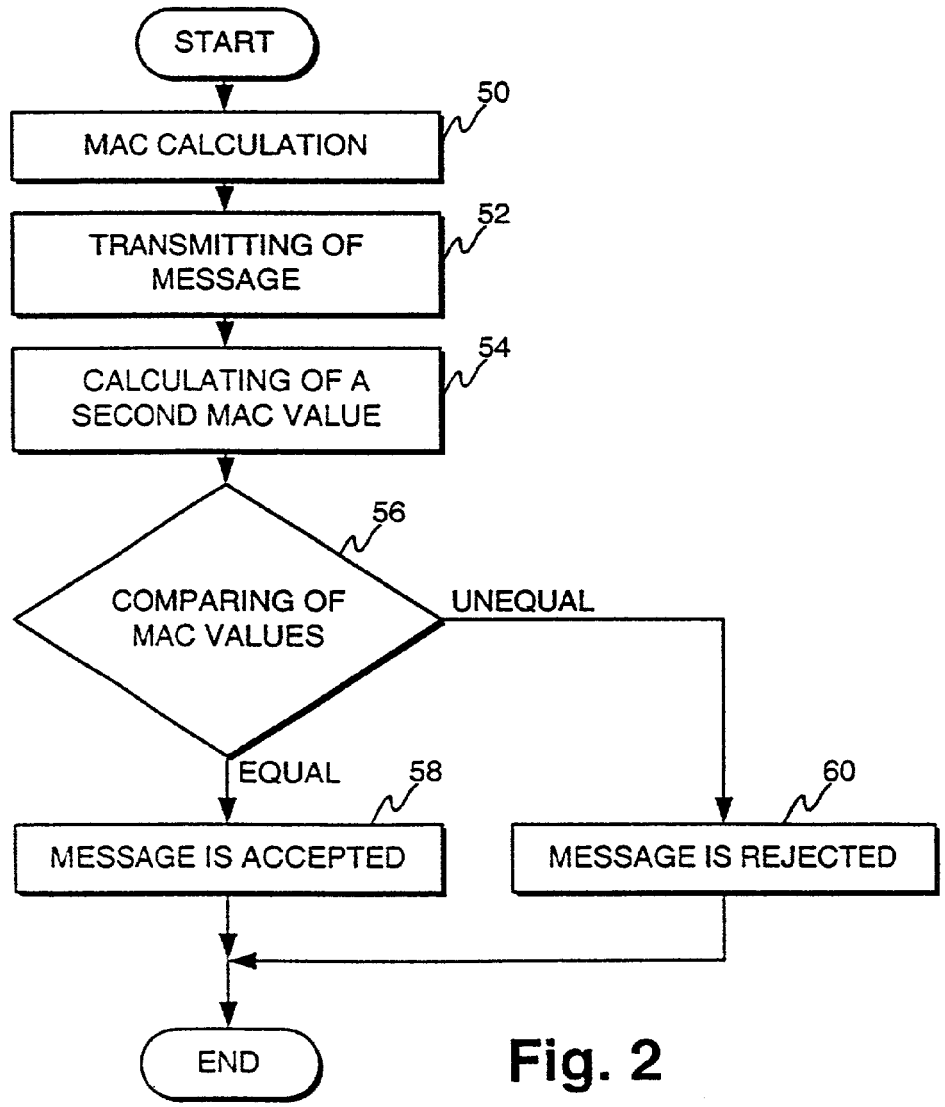
FIG. 2 illustrates a method according to an advantageous embodiment of the invention.

FIG. 2 illustrates a method according to an advantageous embodiment of the invention. FIG. 2 illustrates a method for integrity checking of a message transmitted during a connection between a cellular telecommunication network and a mobile station.

In the first step 50, the transmitting party calculates the authentication value (MAC) of the message on the basis of the message, a first value specified by the network, said first value being valid for one connection only, a second value specified at least in part by the network, and a third value at least partly specified by the mobile station. Preferably, said first value is a pseudorandom value such as the RANDOM value described previously. Further, said third value is preferably a counter value such as the COUNT value described previously, which value is incremented during the connection. For example, the RLC PDU value can be used for generation of the COUNT value. As described previously, the mobile station specifies an initial value for the counter value in the beginning of the connection. The initial value can be used as a starting value for a counter producing the COUNT values, or the initial value can be combined with some other counter value such as the RLC PDU value for producing said third value.

In the next step 52, the message is transmitted from the transmitting party to the receiving party, which calculates a second MAC value as described previously, and compares the received MAC value and the calculated MAC value in step 56. If they are found to be equal, the message is accepted in step 58, and if they are found to be unequal, the message is rejected in step 60. In the case of uplink messaging, the steps of calculation 54 and comparison 56 can advantageously be performed by a radio network controller in the cellular telecommunication network. The method of FIG. 2 is used for checking the integrity of at least some of uplink and downlink messages.

Figure 3:
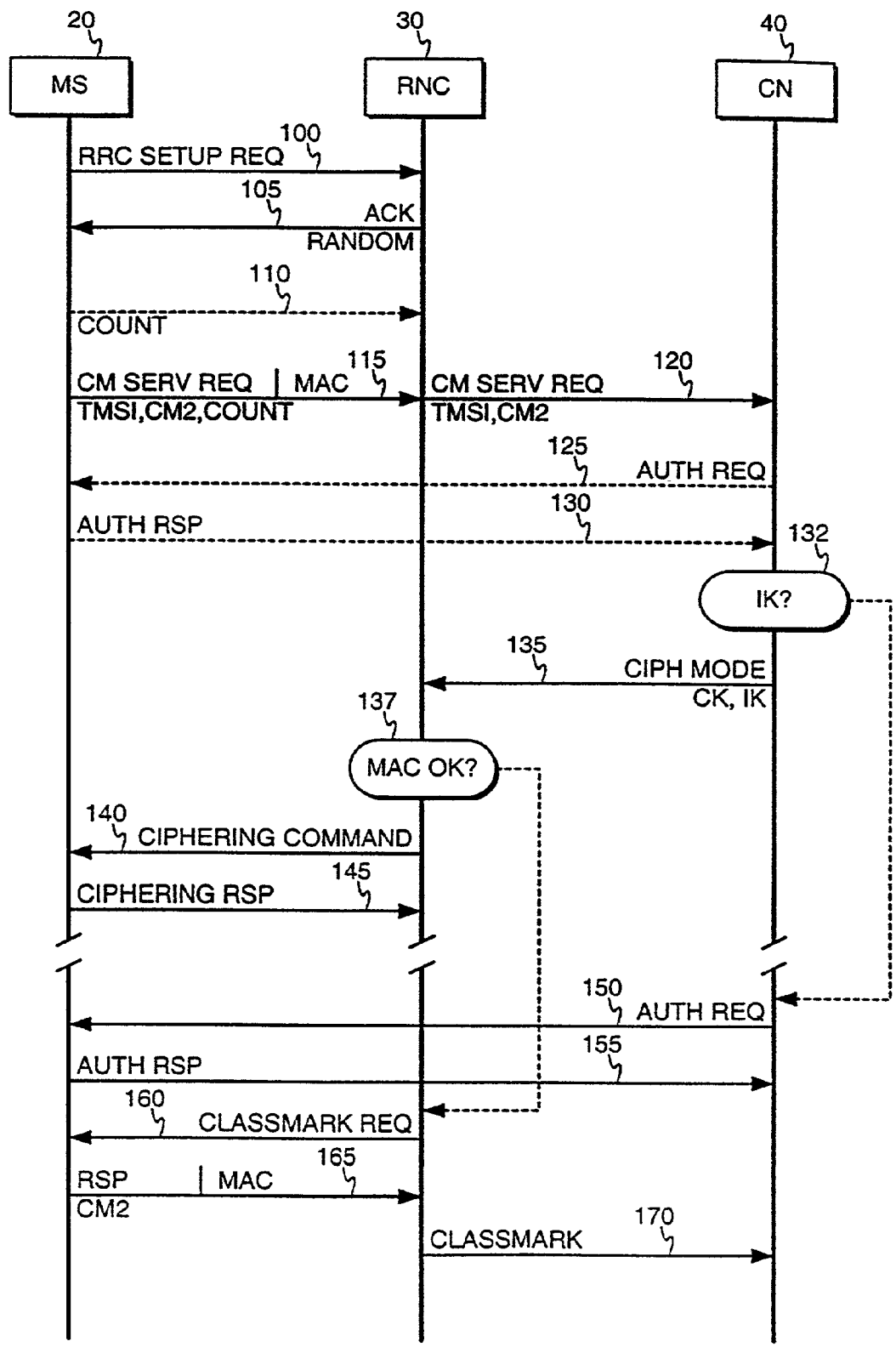
FIG. 3 illustrates signalling according to an advantageous embodiment of the invention.

FIG. 3 illustrates one example of how to initiate a connection according to an advantageous embodiment of the invention. FIG. 3 shows an advantageous solution to the problem of how to exchange two initial values for the purposes of integrity checking. We note here that the signalling sequence shown in FIG. 3 is in no way limited to passing only the COUNT and RANDOM values described previously. Signalling according to FIG. 3 can be used for exchange of any two keys in the beginning of a connection. FIG. 3 shows as an example signalling associated with a mobile originated call, but corresponding signalling sequences can be used also in other situations, such as in establishing a mobile terminating call, or in a paging response procedure.

FIG. 3 shows a particular example of a method according to the invention. The central idea in FIG. 3 is, that the RNC stores the message or messages received from the mobile station and authenticated with a MAC value until the time, when it is able to check the MAC value of the message(s). If one or all of the MAC values are later found to be false, the network can then decide, if it should discard the initiated connection.

FIG. 3 illustrates signalling between a mobile station MS 20, a radio network controller RNC 30, and core network CN 40 in a situation, in which the mobile station initiates a connection. FIG. 3 illustrates the signalling using terminology of the UMTS system. In the first step 100, the mobile station sends the initial connection request message RRC SETUP REQ to the network. After receiving the connection request message, the RNC generates the RANDOM value, after which the RNC replies by sending 105 an acknowledgment message ACK to the mobile station. The RNC specifies the RANDOM value to the mobile station by attaching the value as a parameter to the ACK message, which is shown in FIG. 3 by the label RANDOM appearing under the arrow 105. After receiving the acknowledgment and the RANDOM value, the mobile station needs to send the initial COUNT value to the network. This can be realized basically in two ways: by defining a new message for that purpose, for example in the RRC level, or by attaching the COUNT value as a parameter to an existing message. Arrow 110 denotes the former approach, i.e. denotes a message specifically defined for transmitting the COUNT value. Arrow 115 denotes the latter approach, i.e. attaching the COUNT value as a parameter to an existing message. In the example of FIG. 3, the existing message is a CM SERV REQ message. Further, also an IK key identification number may be transmitted as a parameter to the message. During an authentication process in which an IK is generated, each IK is assigned an identification number, whereafter the MS and the network may refer to the IK simply by using the identification number.

In the example of FIG. 3, the mobile station sends a classmark service request message CM SERV REQ to the network, specifying a temporary identifier TMSI and a capability class identifier CM2 to the network. If a specific message was not used to transport the initial COUNT value to the network, the initial COUNT value is passed to the network as a further parameter to the CM SERV REQ message. Further, the mobile station transmits a MAC value calculated on the basis of the COUNT and RANDOM values, and an IK value received and stored during a previous connection. Upon receiving the message, the RNC removes and stores the MAC value from the message as well as the possibly existing COUNT value, and forwards 120 the rest of the message to the core network. The RNC stores the whole message as well for later use, which will be described later. According to UMTS specifications, the core network may perform an authentication procedure at this stage, which is represented by arrows 125 and 130 in FIG. 3, corresponding to authentication request AUTH REQ and authentication response AUTH RSP messages.

The next step depends on whether the network has an IK value for the mobile station or not. If the network performed the authentication in steps 125 and 130, the network has the IK value determined in the authentication. Alternatively, the network may have an old IK value stored in relation to a previous connection. The IK value is stored in the core network registers. If the network has an IK value, the method continues at step 135; if not, at step 150. This is represented by step 132 and the associated dashed arrow in FIG. 3.

In step 135, the core network sends a ciphering mode CIPH MODE message to the RNC, attaching the ciphering key CK and the IK value as parameters to the message. With this message, the CN supplies the IK value to the RNC, which was previously unaware of the IK value, if the authentication procedure was not performed at steps 125 and 130. At this stage, the RNC is able to check the CM SERV REQ message stored at step 115, since it now has the COUNT, the RANDOM, and the IK values necessary for calculating the MAC value of the message. The RNC calculates a MAC value and compares 137 it to the MAC value stored previously at step 115. If the match, the method continues at step 140. If they do not match, the method continues at step 160.

In step 140, the RNC sends to the MS a CIPHERING COMMAND message to start ciphering, to which the MS replies 145 by sending a ciphering response message CIPHERING RSP back to RNC. After that, the communication continues normally, and the continuation is not depicted in FIG. 3.

In step 150, the network performs an authentication process, which is represented by arrows 150 and 155 in FIG. 3, corresponding to authentication request AUTH REQ and authentication response AUTH RSP messages. After that, the core network informs the RNC about the new IK (not shown).

At this stage the RNC needs to make sure, that the MS is the correct one and can calculate the MAC values accordingly. The RNC can perform for example a classmark request procedure or some other suitable procedure to that effect. That is, the RNC sends 160 a classmark request CLASSMARK REQ message to the MS, which replies by sending 165 a response message RSP back to the RNC, attaching the classmark information CM2 as a parameter to the message, and the calculated MAC value at the end of the message. Now the RNC can again check the MAC, and if no hostile party has replayed any of the previous messages, the MAC values calculated by the RNC and the MS will match, since the three key values IK, RANDOM, and COUNT are now known both to the MS and the RNC. After receiving the classmark response message RSP, the RNC sends 170 the classmark information in a CLASSMARK message to the core network, as required by the UMTS specifications.

Although in the previous description, the network is described to specify a random number to be used as the network-specified varying parameter, also other than random values can be used. For example, although being a less advantageous example of an embodiment of the invention, the network may use a counter value, and store the counter value in a central register in order to be able to use a different value during the next connection. Naturally, this embodiment has the disadvantage of the burden of storage of the values of the users to be used in the following connections.

In the previous examples, the invention has been described in relation to a cellular telecommunication system. The invention can be very advantageously used in such a system, since it requires very little messaging, and thus uses only a diminutive amount of valuable air interface resources. However, the invention can be applied also in other communication systems.

The invention has several advantages. For example, according to most advantageous embodiments there is no need for maintaining synchronized state information between different connections. That is, these embodiments do not require the network to store any counter information for effecting the integrity checking which is a considerable advantage, since such storage would have to be effected in a central register such as the VLR (Visitor Location Register) or the HLR (Home Location Register). According to these most advantageous embodiments, all state information about the connection can be discarded on the network side in a mobile network after the connection is released. The invention allows the integrity checking to be performed by a network element outside the core network, such as the RNC in the case the UMTS cellular system.

The invention does not specify any upper limit for the number of values used in calculation of MAC values. Any other values in addition to those described for example in relation to FIG. 1 may be used as well. Further, the invention does not limit, which messages are subjected to integrity checking: all messages, a certain group of messages, or messages selected in some other way.

The name of a given functional entity, such as the radio network controller, is often different in the context of different cellular telecommunication systems. For example, in the GSM system the functional entity corresponding to a radio network controller (RNC) is the base station controller (BSC). Therefore, the term radio network controller is intended to cover all corresponding functional entities regardless of the term used for the entity in the particular cellular telecommunication system. Further, the various message names such as the RRC SETUP REQ message name are intended to be examples only, and the invention is not limited to using the message names recited in this specification.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

The invention claimed is:

1. A method for checking integrity of messages transmitted during a connection between a first party and a second party, comprising:
    specifying a first value at the first party, a second value at least partly at the first party and a count value at least partly at the second party to calculate an authentication value of a message, the first value being valid for one connection between the first party and the second party only;
    transmitting the message and calculated authentication value from the first party to the second party;
    calculating a second authentication value at the second party based on the received message;
    comparing the calculated authentication value with the second authentication value to determine whether the authentication values match;
    accepting the message if the authentication values match;
    wherein the authentication values are calculated based on the message, the first value specified by the first party and the counter value at least partly specified by the second party.

2. The method of claim 1, wherein said first party is a cellular telecommunication network and said second party is a mobile station.

3. The method of claim 1, wherein said first value is a pseudorandom value.

4. The method of claim 2, wherein the mobile station specifies an initial value for the counter value.

5. The method of claim 2, wherein the mobile station specifies an initial value which is combined with a counter value for producing a third value.

6. The method of claim 4, wherein the mobile station uses a value previously stored in the SIM card of the mobile station in specifying said initial value.

7. The method of claim 1, wherein said cellular telecommunication network is an universal mobile telecommunications system network, and said first value is specified by a radio network controller.

8. The method of claim 1, wherein if the authentication values fail to match the message is rejected.

* * * * *